(12) United States Patent
Cromer et al.

(10) Patent No.: US 6,687,348 B2
(45) Date of Patent: Feb. 3, 2004

(54) METHOD AND SYSTEM FOR CONSERVING POWER AND IMPROVING USABILITY FOR PERSONAL COMPUTERS WITH REMOTE STARTUP FEATURES

(75) Inventors: Daryl Carvis Cromer, Apex, NC (US); Joseph Wayne Freeman, Raleigh, NC (US); William Fred Keown, Jr., Raleigh, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 09/991,007

(22) Filed: Nov. 16, 2001

(65) Prior Publication Data

US 2003/0095647 A1 May 22, 2003

(51) Int. Cl.[7] .............................................. H04M 11/00
(52) U.S. Cl. .............................. 379/102.04; 379/93.02; 379/142.05
(58) Field of Search ................ 379/102.04, 102.01, 379/102.02, 93.28, 93.02, 93.05, 142.01, 142.05, 142.07, 142.15

(56) References Cited

U.S. PATENT DOCUMENTS

| | | | |
|---|---|---|---|
| 4,656,318 A | | 4/1987 | Noyes |
| 5,343,516 A | | 8/1994 | Callele et al. |
| 5,351,289 A | * | 9/1994 | Logsdon et al. ............. 379/142 |
| 5,377,260 A | * | 12/1994 | Long ........................... 379/142 |
| 5,727,047 A | | 3/1998 | Bentley et al. |
| 5,926,534 A | * | 7/1999 | Correia, II ............. 379/102.04 |
| 6,111,939 A | * | 8/2000 | Brabanec ................. 379/93.23 |

\* cited by examiner

*Primary Examiner*—Stella Woo
(74) *Attorney, Agent, or Firm*—Sawyer Law Group, LLP; Carlos Munoz-Bustamante

(57) ABSTRACT

A method for remotely powering up a computer, includes: receiving a telephone call by a device coupled to a powered down computer; determining an originator's telephone number for the telephone call; determining if the originator's telephone number matches one of a plurality of authorized telephone numbers; and powering up the computer if the originator's telephone number matches one of the plurality of authorized telephone numbers. The method and system utilizes the well known "Caller-ID" technology to determine the originator's telephone number for a telephone call received by a modem coupled to the computer. If there is no match, the computer remains in a powered down state. In this manner, the system discriminates between the received telephone calls, and avoids powering up the computer when the received call is not for this purpose. This avoids wasting power.

12 Claims, 5 Drawing Sheets

METHOD AND SYSTEM FOR CONSERVING POWER AND IMPROVING USABILITY FOR PERSONAL COMPUTERS WITH REMOTE STARTUP FEATURES

FIELD OF THE INVENTION

The present invention relates to computers and more specifically to conserving power when using computers with remote startup features.

BACKGROUND OF THE INVENTION

It is currently common practice in the computer industry to provide several means, in addition to the power switch, for powering up a computer system from a powered down state. The "powered down" state can be either a cold power off state or a stand-by or power saving state. Means for powering up a personal computer include, for example, utilization of an internal timer, keyboard or mouse input, and various external stimuli such as a "ring" signal detected by a modem attached to a telephone line.

In the case of a "ring" signal, the modem sends a "wake" signal to the computer when the modem detects the "ring" signal. This feature may be desirable for remote power up. Typically, not every call detected by the modem is for the purpose of powering up the computer. Many of these calls are a voice telephone call. However, conventionally, the computer is powered up each time the modem detects the "ring" signal. This wastes power. An extra telephone line dedicated to the computer may be installed, however, this results in an extra expense.

Accordingly, what is needed is an improved method and system for remotely powering up a computer. The improved method and system should discriminate between received telephone calls. It should avoid powering up the computer when the received call is not for this purpose. The present invention addresses such a need.

SUMMARY OF THE INVENTION

A method for remotely powering up a computer, includes: receiving a telephone call by a device coupled to a powered down computer; determining an originator's telephone number for the telephone call; determining if the originator's telephone number matches one of a plurality of authorized telephone numbers; and powering up the computer if the originator's telephone number matches one of the plurality of authorized telephone numbers. The method and system utilizes the well known "Caller-ID" technology to determine the originator's telephone number for a telephone call received by a modem coupled to the computer. If there is no match, the computer remains in a powered down state. In this manner, the system discriminates between the received telephone calls, and avoids powering up the computer when the received call is not for this purpose. This avoids wasting power.

DETAILED DESCRIPTION

The present invention provides an improved method and system for remotely powering up a computer. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system in accordance with the present invention determines an originator's telephone number for a telephone call received by a modem coupled to a computer. The originator's telephone number is then compared with a list of authorized telephone numbers. If there is match, then the computer is powered up. Otherwise, the computer remains in a powered down state.

To more particularly describe the features of the present invention, please refer to FIGS. 1 through 5 in conjunction with the discussion below.

Figure 1:
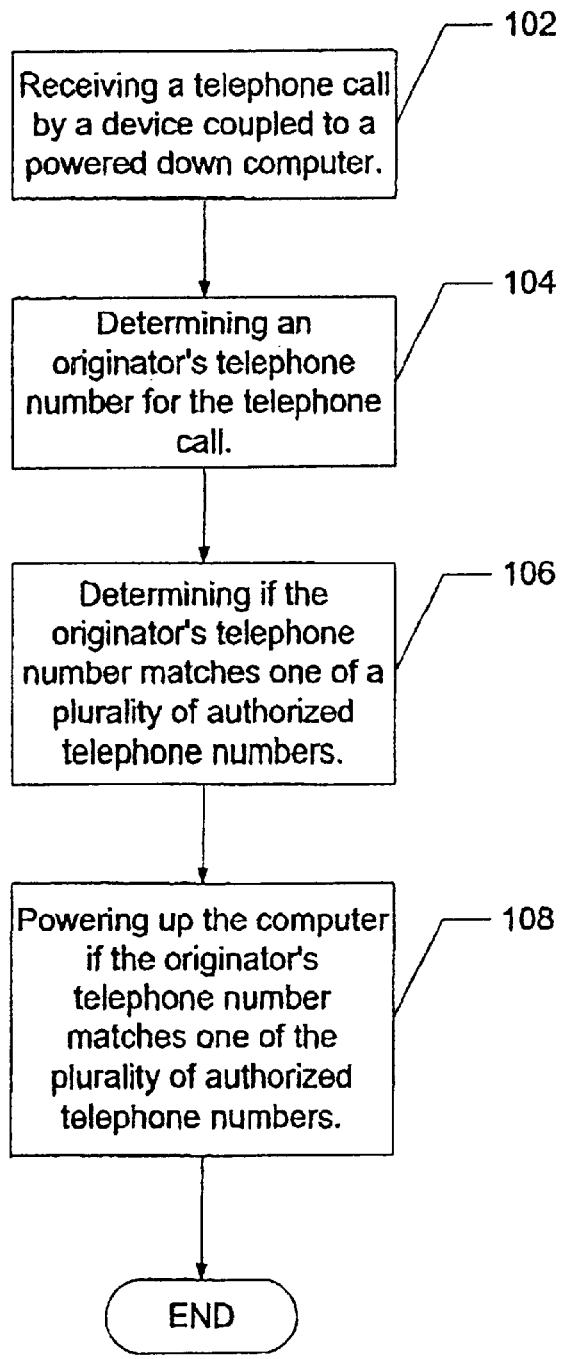
FIG. 1 is a flow chart illustrating a preferred embodiment of a method for remotely powering up a computer in accordance with the present invention.

FIG. 1 is a flow chart illustrating a preferred embodiment of a method for remotely powering up a computer in accordance with the present invention. First, a telephone call is received by a device coupled to a powered down computer, via step 102. In the preferred embodiment, "powered down" refers to either a power off state or a stand-by or power saving state. Next, an originator's telephone number is determined for the telephone call, via step 104. In the preferred embodiment, the well known Caller-ID technology is used to obtain the originator's telephone number. Then, the originator's telephone number is compared with a plurality of authorized telephone numbers to determine if they match, via step 106. In the preferred embodiment, a user may create the list with one or more telephone numbers. An "any" option may be offered to the user as well. If the originator's telephone number matches one of the plurality of authorized telephone numbers, then the computer is powered up, via step 108. In the preferred embodiment, a "wake" signal is generated to initiate the power up. Otherwise, the computer remains in the powered down state.

Figure 2:
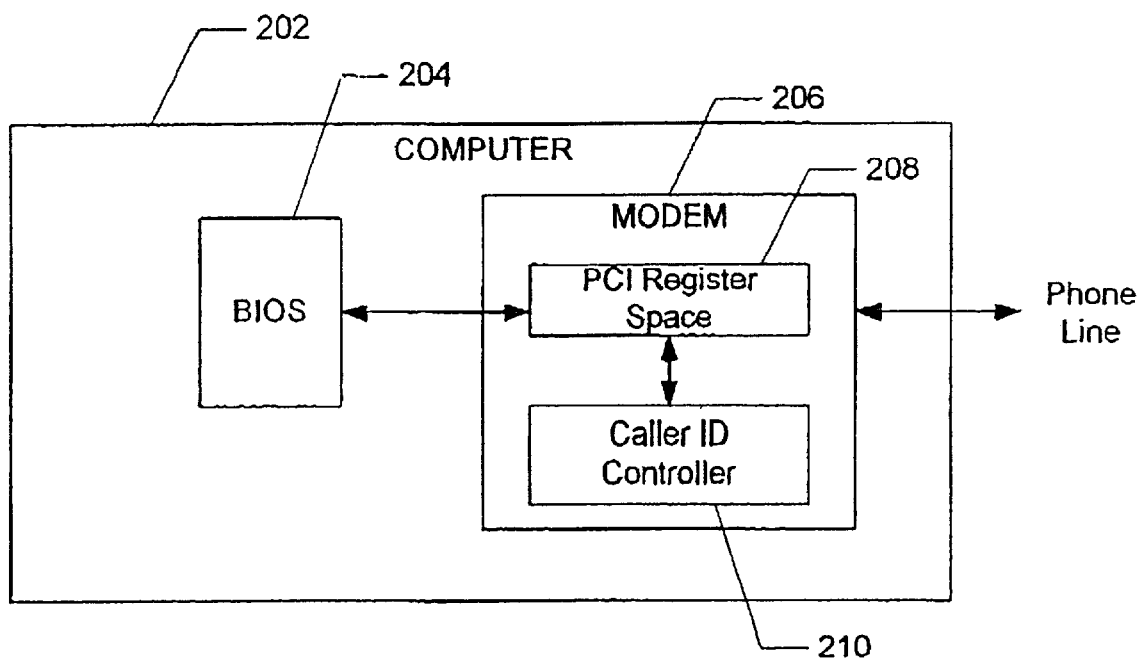
FIG. 2 is a block diagram illustrating a preferred embodiment of a system for remotely powering up a computer in accordance with the present invention.

FIG. 2 is a block diagram illustrating a preferred embodiment of a system for remotely powering up a computer in accordance with the present invention. The system comprises a computer 202 which comprises a Basic Input/Output System (BIOS) 204 and a modem 206. Although the modem 206 is illustrated in FIG. 2 as being internal to the computer 202, it can be external to the computer 202 instead. Within the modem 206 is a Peripheral Component Interconnect (PCI) register space 208 and a caller ID controller 210. The modem 206 is coupled to a telephone line. When the modem 206 receives a telephone call, the caller ID controller 210 determines the originator's telephone number using the Caller-ID technology. The originator's telephone number is then stored in the PCI register 208 space.

Although the preferred embodiment is shown with a modem connected to the system through a PCI interface, one of ordinary skill in the art will understand that the function can be implemented on an external modem connected through a serial interface or on a modem connected through the PCI interface but using other registers within the modem to hold the originator's telephone number, without departing from the spirit and scope of the present invention.

Figure 3:
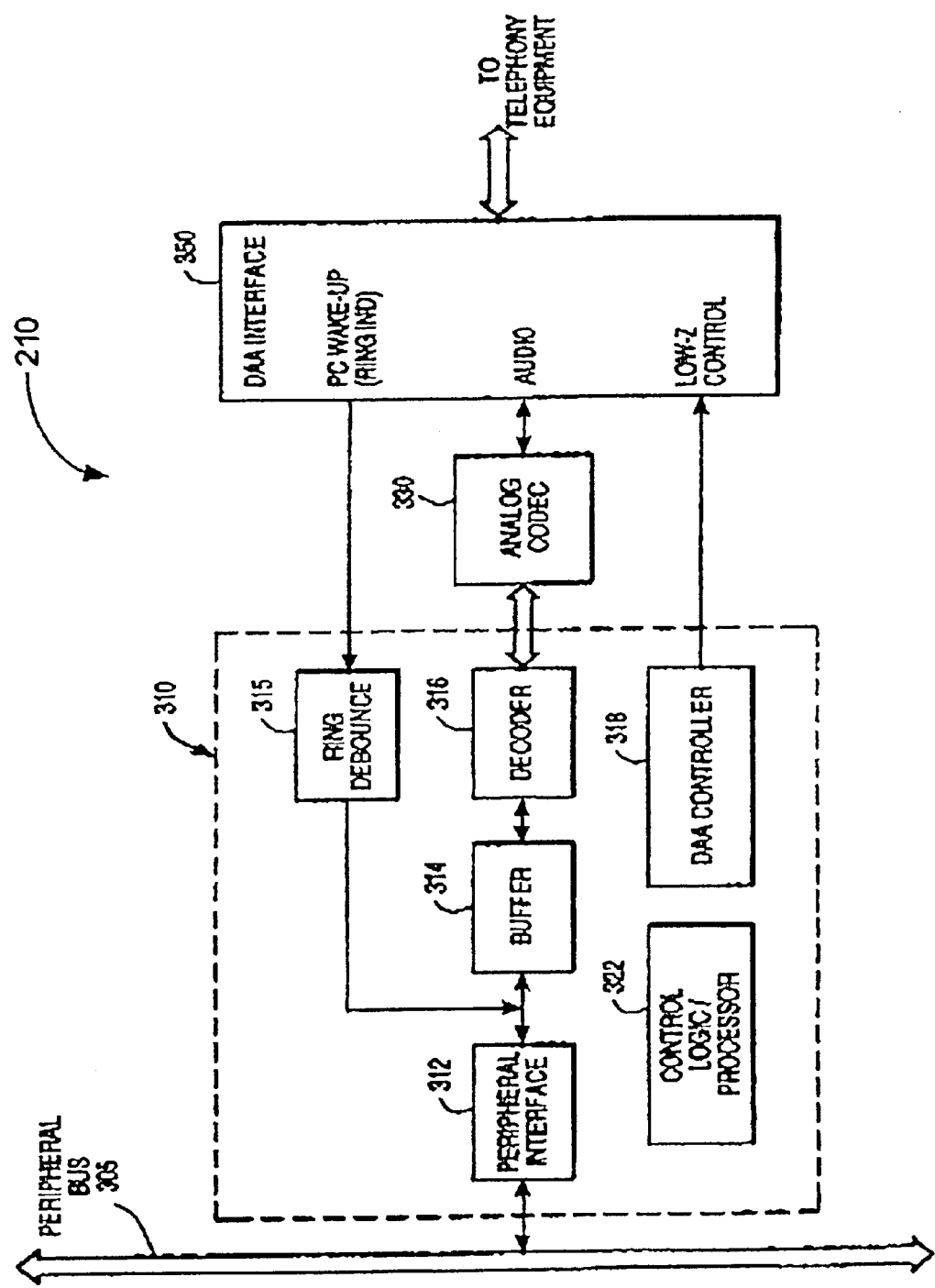
FIG. 3 illustrates an embodiment of the caller ID controller, disclosed in U.S. Pat. No. 6,111,939.

FIG. 3 illustrates an embodiment of the caller ID controller, disclosed in U.S. Pat. No. 6,111,939. The caller ID controller 210 comprises three main elements: the Processor 310, an Analog Codec 330, and a Data Access Arrangement (DAA) Interface 350.

The DAA Interface 350interfaces to the telephone equipment, such as the modem 206, provides audio and ring signal to the Analog Codec 330, provides the wake-up (ring indicator) signal to the processor 310 receives audio signal from the Analog Codec 330, and receives the low-impedance control signal from the Processor 310.

The Analog Codec 330 converts the analog samples from DAA Interface 350 into digital bits to Processor 310. The Analog Codec 330 also converts the digital bits from the Processor 310 to the analog samples to be sent to the DAA Interface 350.

The Processor 310 performs data processing and interfaces to the computer 202. In one embodiment, this interface is through the peripheral bus 305. The Processor 310 comprises a Peripheral Interface 312 such as a PCI interface, a Buffer 314, a Ring Debounce 315, a Decoder 316, a DAA Controller 318, and the Logic Controller/Processor 322.

The DAA Controller 318 switches the signal loop to low impedance to provide the path for the telephone signal to go through. The DAA Controller 318 may be implemented as an Input/Output (I/O) port receiving a command from Control Logic/Processor 322.

The Control Logic/Processor 322 is the controller for the Processor 310. In one embodiment, the Control Logic/Processor 322 is a digital signal processor (DSP) having sufficient memory for program and data storage.

The Caller-ID Decoder 316 sorts out the bit stream into meaningful messages. Examples include performing the Frequency Shift Keying (FSK) operation, stripping off the status bits and converting into ASCII characters. Caller-ID Decoder 316 may be a specially designed circuit to perform the tasks or a software routine executed by Control Logic/Processor 322.

The Ring Debounce 315 filters the ring indicator signal from the DAA Interface 350 to ensure that it is indeed a ring signal. The filtering or debouncing may be carried out by averaging the signal over a period to eliminate glitches or high frequency components caused by noise in the system. Ring Debounce 315 may be a specially designed circuit or a software routine executed by Control Logic/Processor 322.

The Buffer 314 is a storage element that stores the decoded Caller-ID signal or message. Caller-ID Buffer 314 may be implemented by a number of methods, including using the PCI register space 208.

The preferred embodiment of the method in accordance with the present invention may be implemented by the system illustrated in FIG. 2 in a plurality of alternative ways. In a first implementation, the BIOS 204 comprises software and hardware for comparing the originator's telephone number in the PCI register space 208 with the plurality of authorized telephone numbers and for generating a wake signal. In the second implementation, the logic is embedded in the modem 206 for performing the comparison and for generating the wake signal. These implementations are further described with reference to FIGS. 4 and 5 below.

Figure 4:
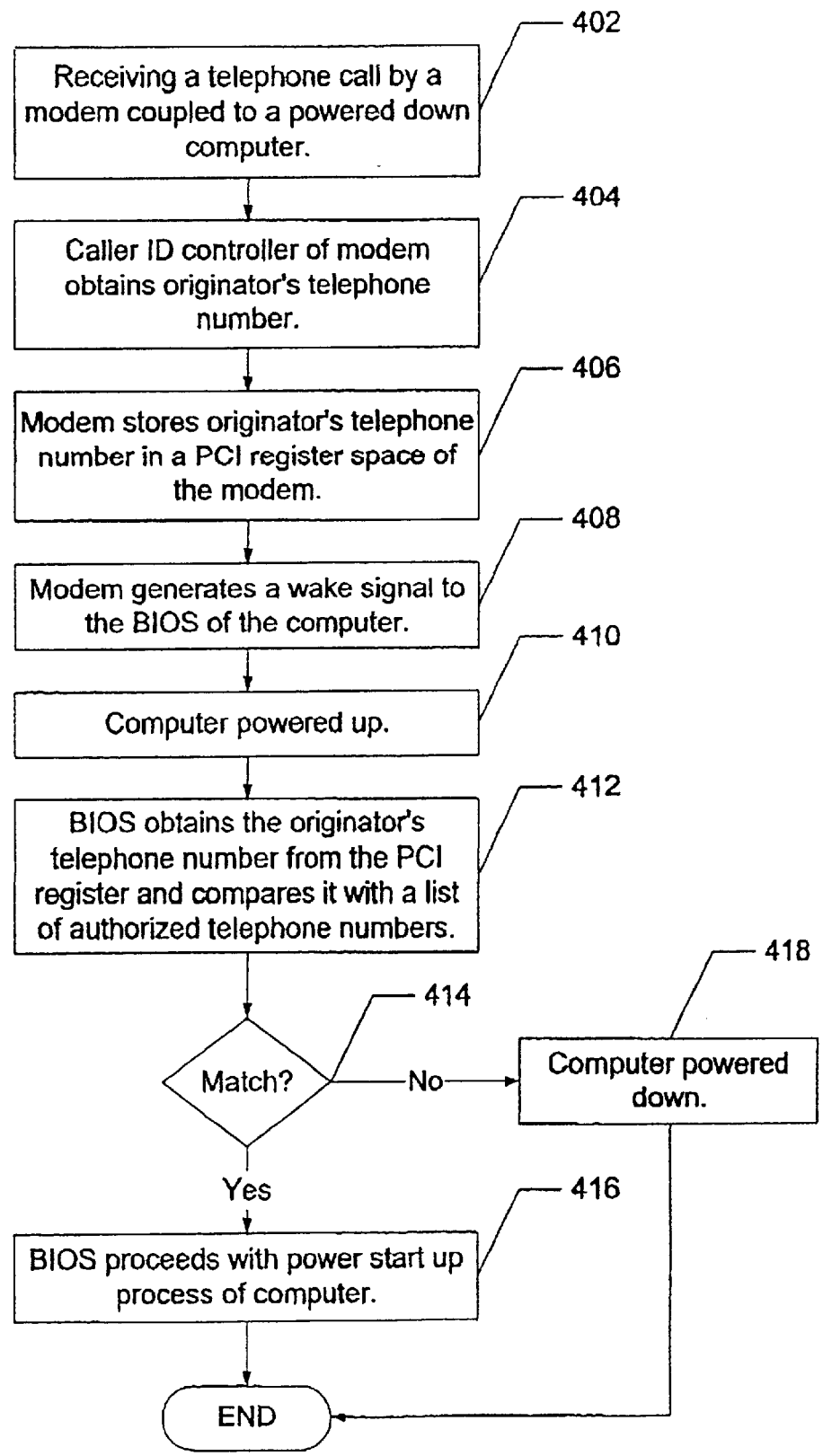
FIG. 4 is a flowchart illustrating the first implementation for the method for remotely powering up a computer in accordance with the present invention.

FIG. 4 is a flowchart illustrating the first implementation for the method for remotely powering up a computer in accordance with the present invention. First, a telephone call is received by the modem 206 coupled to the powered down computer 202, via step 402. Next, the caller ID controller 210 of the modem 206 obtains the originator's telephone number, via step 404. The modem 206 stores the originator's telephone number in the PCI register space 208 of the modem 206, via step 406. The modem 206 then generates a wake signal to the BIOS 204 of the computer 202, via step 408. In response to the wake signal, the computer 202 is powered up, via step 410. The BIOS 204 obtains the originator's telephone number from the PCI register space 208 and compares it with a list of authorized telephone numbers, via step 412. If there is a match, via step 414, then the BIOS 204 proceeds with the power start up process of the computer 202, via step 412. If there is no match, via step 414, then the BIOS 204 returns to its powered down state, via step 418.

Figure 5:
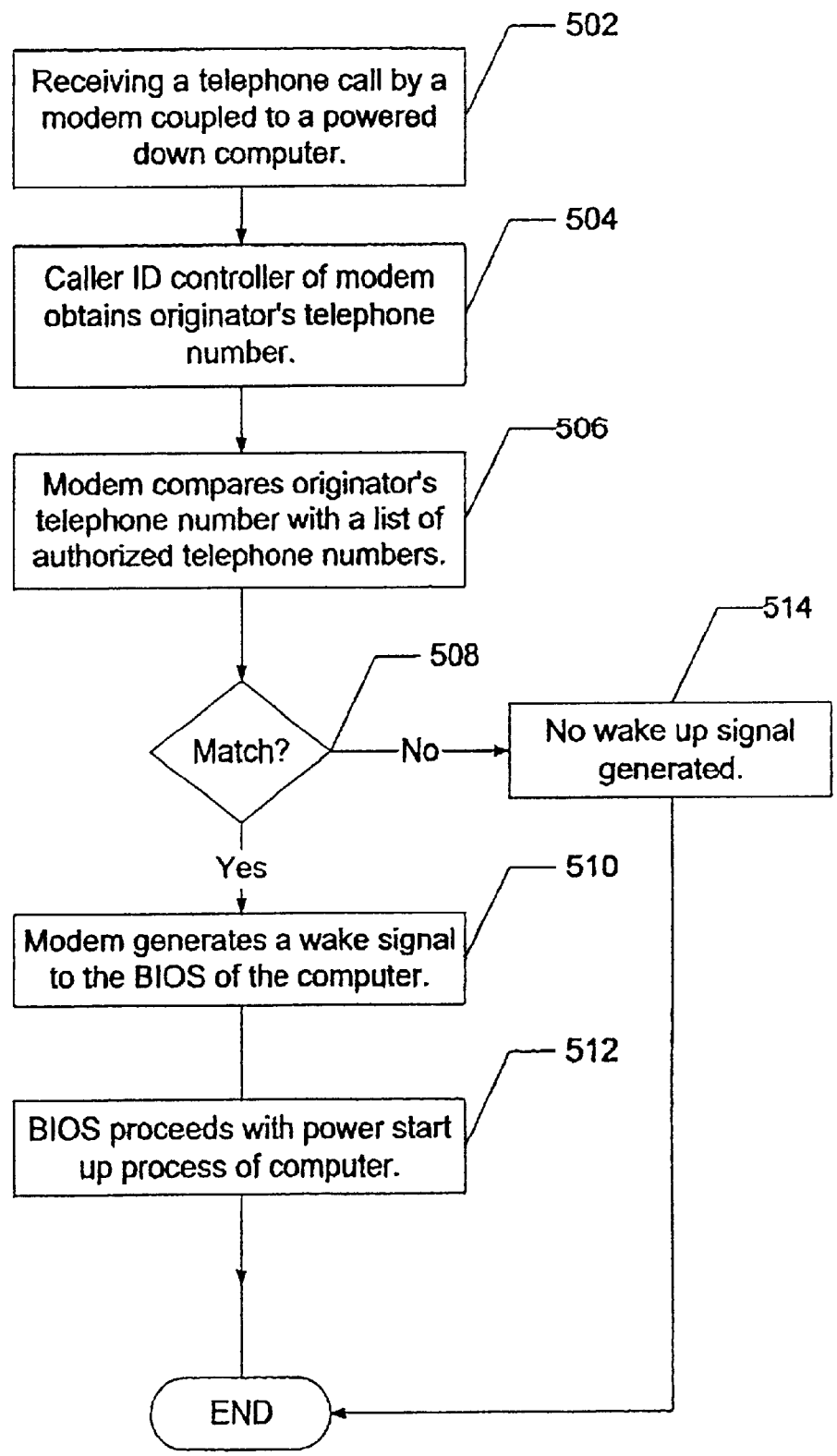
FIG. 5 is a flowchart illustrating the second implementation for the method for remotely powering up a computer in accordance with the present invention.

FIG. 5 is a flowchart illustrating the second implementation for the method for remotely powering up a computer in accordance with the present invention. First, a telephone call is received by the modem 206 coupled to a powered down computer 202, via step 502. Next, the caller ID controller 210 obtains the originator's telephone number, via step 504. The modem 206 compares the originator's telephone number with a list of authorized telephone numbers, via step 506. In the second implementation, the list of authorized telephone numbers was loaded onto the modem 206 in a previous power up cycle. If there is a match, via step 508, then the modem 206 generates a wake signal to the BIOS 204 of the computer 202, via step 510. Upon receiving the wake signal, the BIOS 204 proceeds with the power start up process of the computer 202, via step 512. If there is no match, via step 508, then no wake signal is generated, via step 514, and the computer 202 remains in the powered down state.

In the first and second implementations, the computer 202 comprises software and/or hardware for a user to designate one or more authorized telephone numbers. An option of "any" may be provided to the user as well.

Although the present invention is described with the first and second implementations above, one of ordinary skill in the art will understand that other implementations may be used without departing from the spirit and scope of the present invention.

Although method in accordance with the present invention is described above as being implemented by software and/or hardware on the BIOS 204 or the modem 206, it may be implemented by other computer components without departing from the spirit and scope of the present invention. For example, the method may be implemented by the operating system (OS) used by the computer 202.

An improved method and system for remotely powering up a computer has been disclosed. The method and system utilizes the well known "Caller-ID" technology to determine an originator's telephone number for a telephone call received by a modem coupled to the computer. The originator's telephone number is then compared with a list of authorized telephone numbers. If there is match, then the computer is powered up. Otherwise, the computer remains in a powered down state. In this manner, the system discriminates between the received telephone calls, and avoids powering up the computer when the received call is not for this purpose. This avoids wasting power.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for remotely powering up a computer, comprising the steps of:

(a) receiving a telephone call by a device coupled to a powered down computer;

(b) determining an originator's telephone number for the telephone call;

(c) generating a wake signal by the modem to a Basic Input/Output System (BIOS) of the computer;

(d) comparing the originator's telephone number with a plurality of authorized telephone numbers by the BIOS; and (e) powering up the computer if the originator's telephone number matches one of the plurality of authorized telephone numbers.

2. The method of claim 1, wherein the receiving step (a) comprises:

(a1) receiving the telephone call by a modem coupled to the powered down computer.

3. The method of claim 2, wherein the determining step (b) comprises:

(b1) obtaining the originator's telephone number by a caller ID controller of the modem.

4. The method of claim 3, wherein the determining step (b) further comprise:

(b2) storing the originator's telephone number in a Peripheral Component Interconnect (PCI) register space of the modem.

5. The method of claim 3, wherein the obtaining step (b1) is performed utilizing Call-ID technology.

6. The method of claim 1, wherein the generating step (c) further comprises:

(c1) obtaining the originator's telephone number from a PCI register space of the modem by the BIOS.

7. The method of claim 1, wherein the powering up step (e) comprises:

(e1) proceeding with a power start up process of the computer by the BIOS, if the originator's telephone number matches one of the plurality of authorized telephone numbers.

8. The method of claim 1, further comprising:

(f) maintaining the computer in the powered down state, if the originator's telephone number does not match one of the plurality of authorized telephone numbers.

9. A method for remotely powering up a computer, comprising the steps of:

(a) receiving a telephone call by a modem coupled to a powered down computer;

(b) obtaining an originator's telephone number of the telephone call by a caller ID controller of the modem;

(c) storing the originator's telephone number in a PCI register space of the modem;

(d) generating a wake signal by the modem to a BIOS of the computer;

(e) obtaining the originator's telephone number from the PCI register space by the BIOS;

(f) comparing the originator's telephone number with a plurality of authorized telephone numbers by the BIOS; and (g) proceeding with a power start up process of the computer by the BIOS, if the originator's telephone number matches one of the plurality of authorized telephone numbers.

10. The method of claim 9, wherein the obtaining step (b) is performed utilizing Call-ID technology.

11. The method of claim 9, further comprising:

(h) maintaining the computer in the powered down state, if the originator's telephone number does not match one of the plurality of authorized telephone numbers.

12. A system, comprising:

a powered down computer, wherein the computer comprises a BIOS; and a modem coupled to the powered down computer for receiving a telephone call, wherein the modem comprises:

a caller ID controller for determining an originator's telephone number for the telephone call, and a PCI register space, wherein the originator's telephone number is stored in the PCI register space, wherein the modem generates a wake signal to the BIOS when the model receives the telephone call, wherein the BIOS determines if the originator's telephone number matches one of a plurality of authorized telephone numbers, wherein the BIOS powers up the computer if the originator's telephone number matches one of the plurality of authorized telephone numbers.

* * * * *